United States Patent [19]

Dockser

[11] Patent Number: 5,603,045
[45] Date of Patent: Feb. 11, 1997

[54] MICROPROCESSOR SYSTEM HAVING INSTRUCTION CACHE WITH RESERVED BRANCH TARGET SECTION

[75] Inventor: Kenneth A. Dockser, San Jose, Calif.

[73] Assignee: VLSI Technology, Inc., San Jose, Calif.

[21] Appl. No.: 357,632

[22] Filed: Dec. 16, 1994

[51] Int. Cl.$^6$ .................................................. G06F 9/00
[52] U.S. Cl. ........................ 395/800; 395/376; 395/461; 364/232.8; 364/243.41; 364/261.3; 364/DIG. 1
[58] Field of Search .................................. 395/401, 403, 395/427, 440, 444, 445, 450, 452, 453, 456, 457, 460, 474, 800, 375, 497.04, 461, 458, 459, 462, 465, 467, 471; 371/21.1

[56] References Cited

U.S. PATENT DOCUMENTS

| | | | |
|---|---|---|---|
| 4,991,081 | 2/1991 | Bosshart | 395/403 |
| 5,136,697 | 8/1992 | Johnson | 395/375 |
| 5,179,680 | 1/1993 | Colwell et al. | 395/452 |
| 5,230,068 | 7/1993 | Van Dyke et al. | 395/375 |
| 5,285,527 | 2/1994 | Crick et al. | 395/445 |
| 5,408,620 | 4/1995 | Asakawa et al. | 395/375 |
| 5,412,784 | 5/1995 | Rechtschaffen et al. | 395/375 |
| 5,423,048 | 6/1995 | Jager | 395/775 |
| 5,434,989 | 7/1995 | Yamaguchi | 395/403 |
| 5,442,760 | 8/1995 | Rustad et al. | 395/375 |
| 5,511,178 | 4/1996 | Takeda et al. | 395/452 |

OTHER PUBLICATIONS

Stephen B. Furber, "VLSI RISC Architecture and Organization" *Marcel Dekker, Inc.*, 1989, pp. 32–39.
Brian Case, "AMD's 29030 Lynx Reduces System Cost" *Microprocessor Report*, vol. 5, No. 9, May 15, 1991, pp. 17–20.
Brian Case, "AMD's 29200 Aims at Low–Cost Laser Printers" *Microprocessor Report*, vol. 5, No. 21, Nov. 20, 1991, pp. 21–24.
John L. Hennessy and David. A. Patterson, "Computer Architecture: a Quantitative Approach" *Morgan Kaufmann Publishers, Inc.*, 1990, pp. 307–314.

*Primary Examiner*—Alyssa H. Bowler
*Assistant Examiner*—Dhiren R. Odedra
*Attorney, Agent, or Firm*—Clifton L. Anderson

[57] ABSTRACT

A Harvard architecture data processing system includes a processor, main memory, an instruction cache, and a data cache. As is generally known with the Harvard architecture, these components are interconnected by an instruction bus, an instruction address bus, a data bus, and a data address bus. The instruction cache includes a branch target section and a general instruction section. For each instruction request by the processor, both sections are examined to determine if the requested instruction is in the cache. If it is, it is transmitted from the cache to the processor. If it is not, an instruction line including the requested instruction is fetched from main memory. If the requested instruction represents a jump (the result of an unconditional branch or a conditional branch the condition of which is met) the fetched instruction line can be stored only in the branch target section. If the requested instruction is simply the one located at the address one above that of the previous instruction, the fetched instruction line can only be stored in the general instruction section. This approach preserves branch targets in cache, while allowing all cached instructions to be available to the processor irrespective of whether a jump is called for.

3 Claims, 2 Drawing Sheets

MICROPROCESSOR SYSTEM HAVING INSTRUCTION CACHE WITH RESERVED BRANCH TARGET SECTION

BACKGROUND OF THE INVENTION

The present invention relates to computer architecture and, more particularly, to computer architectures including cache memory. A major objective of the present invention is to provide for improved handling of branch instructions by cache memory.

Much of modern progress is associated with advances in computer performance. Computer performance has been enhanced by the development of ever faster microprocessors. However, increases in microprocessor speed provide diminishing returns unless the speed of their interaction with associated components is also increased.

One bottleneck has been the communication rate between a microprocessor and main memory. The instructions to be executed by the microprocessor and the data on which operations implemented by the instructions are to be performed are stored at addresses within main memory. To access instructions and data, the microprocessor transmits addresses to main memory. The main memory decodes the address and makes the contents at the requested address available for reading and/or writing. The time required for the microprocessor to transmit an address to main memory and receive the respective contents therefrom can significantly constrain system performance.

Cache memories relax this performance constraint. A cache memory is a small, fast memory that keeps copies of recently used memory items. When these items are used again, for example, in a program loop, they can be accessed from the cache memory instead of main memory. Instead of slower main memory access speeds, the processor can operate at faster cache access speeds most of the time. Cache memories are used extensively in high-performance computers and are migrating to smaller computer systems. In particular, cache memories are being implemented in the increasingly popular reduced-instruction set computers (RISC) because they rely on fast execution of relatively high numbers of simple instructions.

Because it is small, a cache memory can be quickly filled. Once filled, storing more recently used memory items requires erasing less recently used memory items. The algorithm that determines when a newly requested memory item is to be stored in cache memory and what cache memory item it is to replace is critical to cache performance. A "least recently used" criterion can be used. However, in its simplest form, this criterion could lead to removal of all instructions stored in cache when a large data transfer occurs. For this reason, some systems, e.g., those employing a "Harvard architecture" use separate instruction and data caches so that data is only replaced by data and instructions are only replaced by instructions.

More sophisticated cache systems provide for finer differentiation of types of memory items. For example, a separate cache can be provided for branch target instructions (as in, for example, the AMD 29000 manufactured by Advanced Micro Devices, San Jose, Calif.). By default, instructions are executed in the order of their addresses in main memory. However, "branch" instructions either conditionally or unconditionally call for jumps to instructions out of sequence. Unless measures are taken to "protect" branch targets in a cache, they are likely to be replaced by general instructions before they are called for again. Providing a dedicated branch target cache solves this problem.

While caches are generally designed to operate invisibly to the program, some cache systems provide caches that are under program control. Thus a programmer can select certain frequently used instructions to remain relatively permanently in cache memory.

Because total cache memory is limited, dedicating sections of cache memory to specific memory item types or uses can impair performance where the sizes of the sections are not well matched to the frequency of use of the respective item type. For example, a large branch instruction section can limit the size of the section for general instructions. This can result in non-optimal performance when the percentage of non-branch instructions is relatively high. In addition, cache segmentation can result in some redundancy and complexity where an instruction is called for (at different times) in sequence and as a branch target. In any event, cache design is a subject of intense effort, and further refinements are eagerly sought.

SUMMARY OF THE INVENTION

In accordance with the present invention, a computer system includes an instruction cache that includes both general instruction and branch target sections. When a processor requests an instruction, both sections are checked for its presence. However, an item from main memory can be stored in the branch target section only if it is the target of a branch instruction. Accordingly, branch targets can be protected from overwrite by instructions that are not branch targets, while remaining available to the processor when called for even in the absence of a branch instruction.

A data processing system includes a central processor, main memory, a cache for storing instructions, and buses for conveying addresses, instructions, and data among these components. The cache includes cache memory, a cache hit detector, cache logic for governing cache entries, and router means to select between the cache and main memory as the source for instructions. In addition, the data processing system includes a branch detector that can be a separate component or part of the processor or the cache.

The cache logic is responsive to the branch detection signal. If an instruction calls for a branch and the target of the branch is not in the cache, the cache logic enables the branch target section to consider the target instruction from main memory as a replacement for an existing entry. (In general, the target instruction will be fetched as part of a "target" line of instructions having consecutive addresses in main memory. Accordingly, when reference is made herein to an instruction fetched from main memory and stored in the cache, it is implicit that the instruction is transferred as part of an incorporating line of one or more instructions.) The cache logic concurrently disables the general instruction section so that the branch target from main memory is not considered for entry therein. If no branch is called for and the requested instruction is not in the cache, the general instruction section is enabled and the branch target section is disabled.

When a jump is called for by an unconditional branch instruction or a conditional branch instruction the condition of which is met, the fetched target instruction can only be stored in the branch target section of the cache. When the condition of a conditional branch instruction is not met, the succeeding instruction (if not already in the cache) can be handled in two different ways. Preferably, the succeeding instruction is stored in the general instruction section. Alternatively, the succeeding instruction is stored in the branch target section. The deciding factor is the method used to detect branches. If the method involves simply examining the instructions to determine if they are branch instructions, then it is convenient to store succeeding instructions in the branch target section. The preferred approach involves detecting when a branch is actually called for so that succeeding instructions (when a branch condition is not met) are stored in the general instruction section.

The present invention shares with systems employing a dedicated branch target cache the advantage that branch targets are not overwritten by other instructions. An advantage of the invention over dedicated branch target caches is that the contents of the branch target section are available to the processor even when no branch is called for. Thus, if a branch target happens to be requested in sequence, it is provided to the processor from the cache. Likewise, if an instruction in the general instruction section is called for by a branch instruction, it is provided by the cache. Thus, the chances for a hit are significantly greater than if a dedicated branch target cache were used. Furthermore, since a hit is indicated irrespective of the occurrence of a branch, there is no problem with an instruction being entered twice as can occur with systems with dedicated branch instruction caches. These and other features and advantages of the present invention are apparent from the description below with reference to the following drawings.

DESCRIPTION OF THE PREFERRED EMBODIMENTS

Figure 1:
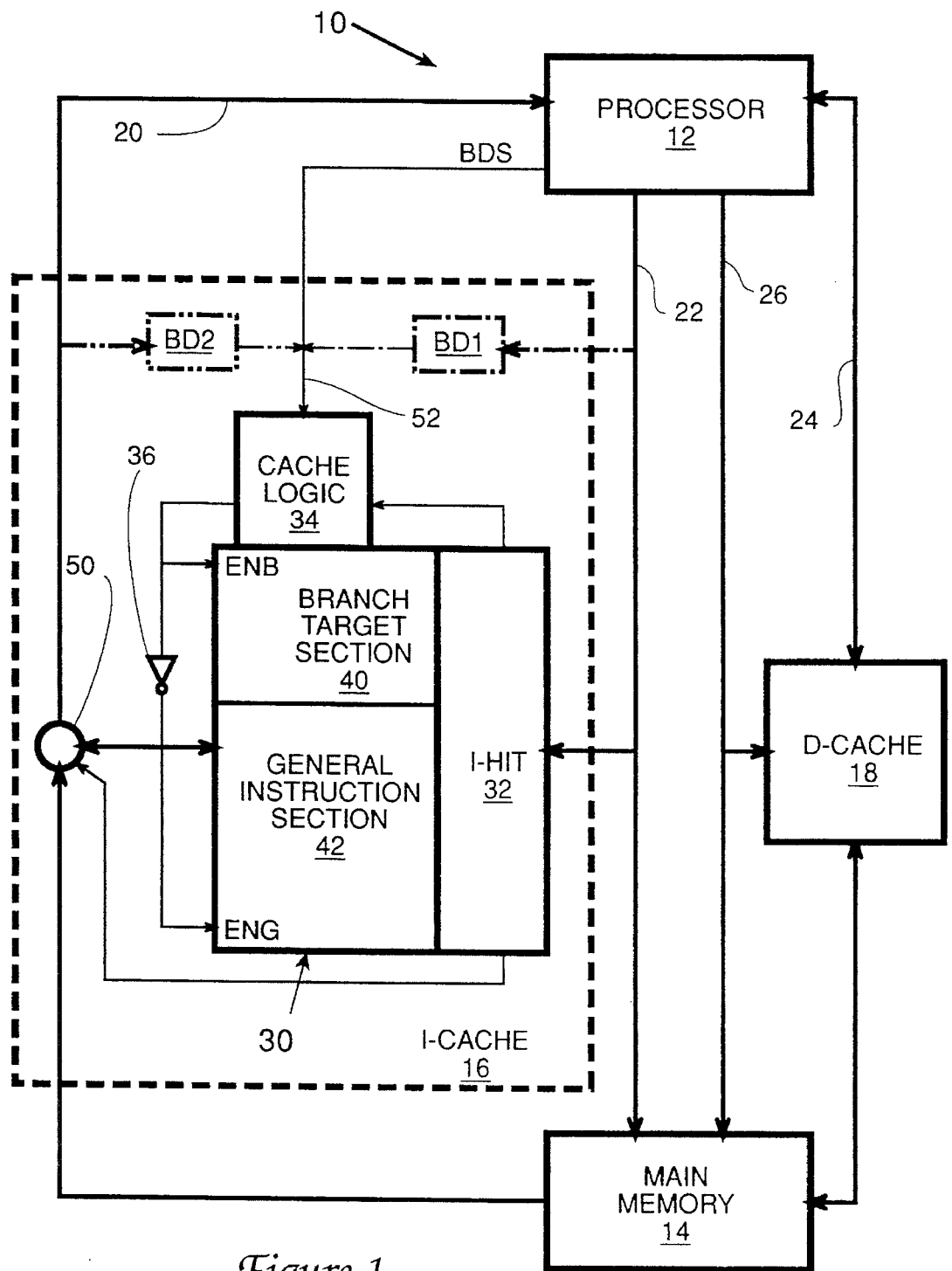
FIG. 1 is a schematic diagram of a data processing system in accordance with the present invention.

In accordance with the present invention, a data processing system 10 comprises a processor 12, main memory 14, an instruction cache 16, and a data cache 18, as shown in FIG. 1. Processor 12 has a Harvard architecture in that it utilizes four buses, an instruction bus 20, an instruction address bus 22, a data bus 24, and a data address bus 26. Each of these buses couples processor 12 to main memory 14 as is known in the art. Main memory 14 permits instructions and data to be addressed independently via respective address buses 22 and 26. Data cache 18 is conventional and is coupled to data bus 24 and data address bus 26. Instruction cache 16 is coupled to instruction bus 20 and instruction address bus 22.

Instruction cache 16 includes cache memory 30, hit detector 32, and cache logic 34. Cache logic 34 includes an inverter 36, shown outboard in FIG. 1. Cache memory 30 includes a branch target section 40 and a general instruction section 42. Hit detector 32 indicates when an instruction requested by processor 12 can be found in instruction cache 16. This indication controls a router 50 so that the requested instruction is provided to processor 12 by instruction cache 16 when that instruction is stored in cache memory 30; otherwise, the instruction is provided from main memory 14. In the later case, the requested instruction is first stored in cache memory 30 as part of a four-word instruction line; then the requested instruction is forwarded to processor 10.

It is a feature of the present invention that an instruction stored in either branch target section 40 or general instruction section 42 is available to be transmitted to processor 12 irrespective of whether the previous instruction called for a branch or not. In other words, cache memory 30 is functionally undivided during instruction reads.

In contrast, cache memory 30 is functionally divided during instruction writes. Writes are called for when hit detector 32 indicates to cache logic 34 that a miss (non-hit) has occurred. Accordingly, the requested instruction is fetched from main memory 14 for storage in cache memory 30 in accordance with the algorithm implemented by cache logic 34; a copy of the requested instruction is transferred to processor 12. If the instruction is fetched as the result of a jump (the result of an unconditional branch or a conditional branch the condition of which is met), it can only be stored in branch target section 40. If the instruction is fetched in sequence (in response to a non-branch instruction or a conditional branch instruction the condition of which is not met), it can only be stored in the general instruction section. The implemented algorithm can provide for some fetched instructions not being stored in either section.

Accordingly, processor 12 outputs a branch detection signal BDS along line 52 to indicate whether or not a branch has been called for. When cache logic 34 receives a "miss" indication from hit detector 32, it uses branch detection BDS to determine which section the instruction fetched from main memory 14 should be entered into. If branch detection signal BDS indicates a branch has been called for, the write enable ENB for branch target section is activated and the write enable ENG for general instruction section 42 is disabled. If branch detection signal BDS indicates that no branch has been taken, write enable ENG is activated and write enable ENB is deactivated. The opposing operation of the write enables is indicated by the presence of inverter 36.

Figure 2:
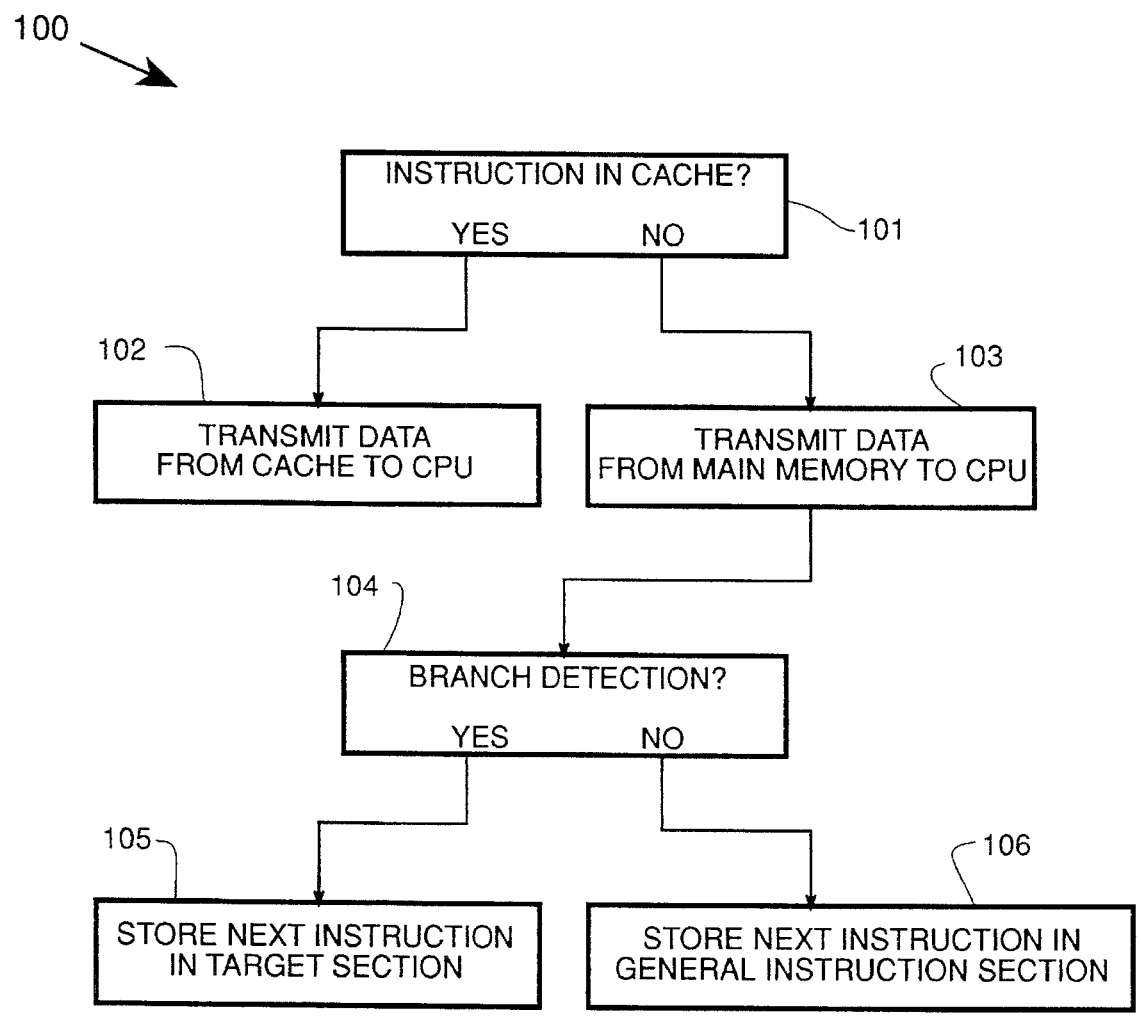
FIG. 2 is a flow chart of a method employed by the system of FIG. 1.

A method 100 practiced using data processing system 10 is illustrated in the flow chart of FIG. 2. Upon a processor request for an instruction, a determination is made whether the instruction is in the instruction cache at step 101. If it is, it is transmitted from the cache to the processor at step 102. If it is not, the requested instruction is fetched from main memory to the processor at step 103. Typically, the requested instruction is fetched as part of an instruction line that is stored in the instruction cache first; then requested instruction is relayed from the instruction cache to the processor. However, the requested instruction can also be transmitted directly from main memory to the processor; then, as part of the incorporating instruction line, it can be transferred to the instruction cache.

Given a fetch from main memory, the presence of a branch is determined at step 104. If a branch is detected, the fetched instruction is stored in the branch target section at step 105. If a branch is not detected, the fetched instruction is stored in the general instruction section at step 106.

Branch detection step 104 preferably involves detection of an actual rather than a potential branch. In this case, a conditional branch instruction the condition of which is not met does not trigger an entry into the branch target section of the cache. This approach can be implemented as in system 10 by having the processor make the determination either that the present instruction is an unconditional branch or that the present instruction is a conditional branch and its condition is met.

An alternative approach is to compare successive address requests to detect discontinuities. In FIG. 1, branch detector BD1 is shown (in dot-dash ghost) coupled to instruction address bus 22 for this purpose. The output of branch detector BD1 is used by cache logic 34 to select cache sections for storing instructions. This approach is logically equivalent to the preferred approach, but slows processing because the branch detection must await generation of the requested address.

A second alternative is to use a branch detector BD2 coupled to the instruction bus to determine whether an instruction being transmitted to the processor is a branch instruction. This approach does not distinguish between satisfied and unsatisfied branch conditions. Accordingly, the address succeeding a conditional branch instruction the condition of which is not met will be entered into the branch target section rather than the general instruction section. Such entries do not make efficient use of the branch target section. On the other hand, this approach makes the branch determination early—even before the instruction is executed. Usually, if the branch is not taken, the succeeding instruction will already be part of the instruction-line including the branch instruction; thus, most of the time, the succeeding instruction will be already in the cache and not need to be written into either section.

While the present invention is illustrated in the context of a Harvard architecture, it can be used with any processor architecture that permits instructions to be cached. It is perfectly well suited for Von Neumann architectures and modified Harvard architectures. There can be a separate data cache or a combined data and instruction cache or no data cache. The invention provides for any line size, i.e., number of instruction words per line stored in the instruction cache. Additionally, while the disclosed instruction cache is fully associative, the invention provides for caches with any degree of associativity. These and other modifications to and variations upon the preferred embodiments are provided for by the present invention, the scope of which is limited only by the following claims.

What is claimed is:

1. A data processing system comprising:

a processor for executing programs constituted by sequential instructions, said instructions including branch instructions that call for branches to respective branch target instructions;

main memory for storing said instructions at respective memory addresses;

bus means for conveying address requests from said microprocessor to said main memory and for conveying instructions from said main memory to said processor for processing;

cache memory for storing instruction lines along with respective tags indicating their respective addresses in said main memory, each instruction line including at least one instruction, said cache means including a branch target section and a second section, said cache memory being coupled to said bus means;

hit means for providing a hit indication indicating whether or not the instruction at a requested address is stored in said cache means, said hit means having a bus input coupled to said bus means and a tag input coupled to said cache memory, said hit means having a hit output for transmitting said hit indication;

routing means for causing an instruction stored at a main memory address to be conveyed to said processor from said cache means when said instruction is stored in said cache means and from said main memory when said instruction is not stored in said cache means, said routing means having a control input coupled to said hit output;

branch detection means for indicating an enable condition from the set of conditions consisting of an instruction-type condition that the current instruction is a branch instruction and an instruction-result condition that a branch is called for; and cache logic for replacing a first instruction line stored in said cache means with a second instruction line including an instruction at a requested address, said second instruction line being conveyed from said main memory to said processor, said cache logic replacing said first instruction line when it is stored in said branch target section only when said enable condition is indicated, said cache logic replacing said first instruction line when it is stored in said second section only when said enable condition is not indicated.

2. A data processing system as recited in claim 1 wherein said enable condition is said instruction-result condition, said cache logic replacing said first instruction line when it is in said branch target section only when a branch is called for.

3. A data processing system as recited in claim 1 wherein said enable condition is said instruction-type condition, said cache logic replacing said first instruction line when it is in said branch target section only when the current instruction is a branch instruction.

* * * * *